(12) United States Patent
Narita

(10) Patent No.: US 10,183,362 B2
(45) Date of Patent: Jan. 22, 2019

(54) CLAD ALUMINUM ALLOY MATERIAL WITH EXCELLENT CORROSION RESISTANCE AND BRAZEABILITY AND METHOD FOR PRODUCING THE SAME

(71) Applicant: UACJ Corporation, Tokyo (JP)

(72) Inventor: Wataru Narita, Tokyo (JP)

(73) Assignee: UACJ Corporation, Tokyo (JP)

(*) Notice: Subject to any disclaimer, the term of this patent is extended or adjusted under 35 U.S.C. 154(b) by 121 days.

(21) Appl. No.: 15/125,968

(22) PCT Filed: Mar. 11, 2015

(86) PCT No.: PCT/JP2015/001341
§ 371 (c)(1),
(2) Date: Sep. 14, 2016

(87) PCT Pub. No.: WO2015/141192
PCT Pub. Date: Sep. 24, 2015

(65) Prior Publication Data
US 2017/0080528 A1   Mar. 23, 2017

(30) Foreign Application Priority Data
Mar. 19, 2014  (JP) ................... 2014-055786

(51) Int. Cl.
| | | |
|---|---|---|
| C22C 21/00 | (2006.01) | |
| C22C 21/04 | (2006.01) | |
| B23K 35/02 | (2006.01) | |
| B23K 35/28 | (2006.01) | |
| B23K 35/22 | (2006.01) | |
| C22F 1/04 | (2006.01) | |
| F28F 19/06 | (2006.01) | |
| B23K 1/00 | (2006.01) | |
| B23K 1/19 | (2006.01) | |
| F28F 21/08 | (2006.01) | |
| B22D 21/00 | (2006.01) | |
| B23K 35/30 | (2006.01) | |
| C22C 18/04 | (2006.01) | |
| C22C 21/10 | (2006.01) | |
| C22C 23/02 | (2006.01) | |
| C22C 28/00 | (2006.01) | |
| C22F 1/053 | (2006.01) | |
| C22F 1/06 | (2006.01) | |
(Continued)

(52) U.S. Cl.
CPC ........ *B23K 35/0238* (2013.01); *B22D 21/007* (2013.01); *B23K 1/0012* (2013.01); *B23K 1/19* (2013.01); *B23K 35/0222* (2013.01); *B23K 35/22* (2013.01); *B23K 35/28* (2013.01); *B23K 35/282* (2013.01); *B23K 35/284* (2013.01); *B23K 35/286* (2013.01); *B23K 35/288* (2013.01); *B23K 35/30* (2013.01); *C22C 18/04* (2013.01); *C22C 21/00* (2013.01); *C22C 21/02* (2013.01); *C22C 21/10* (2013.01); *C22C 23/02* (2013.01); *C22C 28/00* (2013.01); *C22F 1/04* (2013.01); *C22F 1/053* (2013.01); *C22F 1/06* (2013.01); *C22F 1/165* (2013.01); *F28F 19/06* (2013.01); *F28F 21/084* (2013.01); *F28F 21/089* (2013.01); *B23K 2101/006* (2018.08); *B23K 2101/14* (2018.08); *B23K 2101/34* (2018.08); *B23K 2103/10* (2018.08); *F28F 2275/04* (2013.01)

(58) Field of Classification Search
CPC ...... C22C 21/00; C22C 21/04; B23K 2201/14
See application file for complete search history.

(56) References Cited

U.S. PATENT DOCUMENTS

| | | | | |
|---|---|---|---|---|
| 4,150,980 A | * | 4/1979 | Imaizumi ............... | C22C 21/10 420/540 |
| 2002/0071782 A1 | * | 6/2002 | Hasegawa .............. | C22C 21/00 420/537 |

(Continued)

FOREIGN PATENT DOCUMENTS

| | | |
|---|---|---|
| JP | H11302760 | 11/1999 |
| JP | 2000034532 | 2/2000 |

(Continued)

OTHER PUBLICATIONS

Birol (Journal of Materials Processing Technology 148, 2004, 250-258) (Year: 2004).*

(Continued)

*Primary Examiner* — Liam J Heincer
(74) *Attorney, Agent, or Firm* — JCIPRNET

(57) ABSTRACT

A clad aluminum alloy material exhibiting favorable corrosion resistance and brazeability in an alkaline environment is shown by a clad aluminum alloy material with excellent brazeability and corrosion resistance in which one surface of an aluminum alloy core material is clad with a sacrificial anode material and the other surface is clad with brazing filler material. The core material includes an aluminum alloy of Si: 0.3-1.5%, Fe: 0.1-1.5%, Cu: 0.2-1.0%, Mn: 1.0-2.0%, and Si content+Fe content ≥0.8%, wherein the 1-20 μm equivalent circle diameter Al—Mn—Si—Fe-based intermetallic compound density is $3.0 \times 10^5$ to $1.0 \times 10^6$ pieces/cm², and the 0.1 μm to less than 1 μm equivalent circle diameter Al—Mn—Si—Fe-based intermetallic compound density is at least $1.0 \times 10^7$ pieces/cm². The sacrificial anode material includes an aluminum alloy containing Si: 0.1-0.6%, Zn: 1.0-5.0%, and Ni: 0.1-2.0%.

8 Claims, 1 Drawing Sheet

(51) Int. Cl.
*C22F 1/16* (2006.01)
*C22C 21/02* (2006.01)
*B23K 101/00* (2006.01)
*B23K 101/14* (2006.01)
*B23K 101/34* (2006.01)
*B23K 103/10* (2006.01)

(56) References Cited

U.S. PATENT DOCUMENTS

| | | | | |
|---|---|---|---|---|
| 2003/0000610 A1* | 1/2003 | Koyama | ............... | C22C 21/00 148/690 |
| 2011/0287276 A1* | 11/2011 | Izumi | ............... | B23K 35/0233 428/548 |
| 2012/0145365 A1* | 6/2012 | Yamashita | ........... | B23K 35/282 165/133 |
| 2012/0227871 A1* | 9/2012 | Inoue | ............... | C22C 1/026 148/552 |
| 2013/0255842 A1* | 10/2013 | Hori | ............... | C22F 1/047 148/550 |
| 2014/0134458 A1* | 5/2014 | Fukumoto | .......... | B23K 35/0238 428/654 |
| 2014/0360712 A1* | 12/2014 | Fujita | ............... | C22F 1/00 165/185 |
| 2015/0050520 A1* | 2/2015 | Niikura | ............... | C22C 21/00 428/654 |
| 2016/0116234 A1* | 4/2016 | Murase | ............... | B22D 11/003 165/181 |
| 2016/0161199 A1* | 6/2016 | Ando | ............... | B23K 35/28 165/133 |
| 2016/0276653 A1* | 9/2016 | Seki | ............... | B21B 3/00 |
| 2016/0326614 A1* | 11/2016 | Narita | ............... | F28F 9/0226 |
| 2017/0137919 A1* | 5/2017 | Niikura | ............... | C22C 21/02 |
| 2017/0304954 A1* | 10/2017 | Kirkham | ............ | B23K 35/0238 |
| 2017/0304956 A1* | 10/2017 | Itoh | ............... | B23K 35/286 |
| 2017/0304957 A1* | 10/2017 | Yoshino | ............... | B23K 35/288 |

FOREIGN PATENT DOCUMENTS

| | | |
|---|---|---|
| JP | 2000087170 | 3/2000 |
| JP | 2000096169 | 4/2000 |
| JP | 2003293061 | 10/2003 |
| JP | 2008163366 | 7/2008 |
| JP | 2010095758 | 4/2010 |
| JP | 2013194244 | 9/2013 |
| WO | WO-2014196183 A1 * 12/2014 | ........... B22D 11/003 |

OTHER PUBLICATIONS

Machine Translation of JP 11-302760, 2018 (Year: 2018).*
"International Search Report (Form PCT/ISA/210)", dated May 19, 2015, with English translation thereof, pp. 1-5.

* cited by examiner

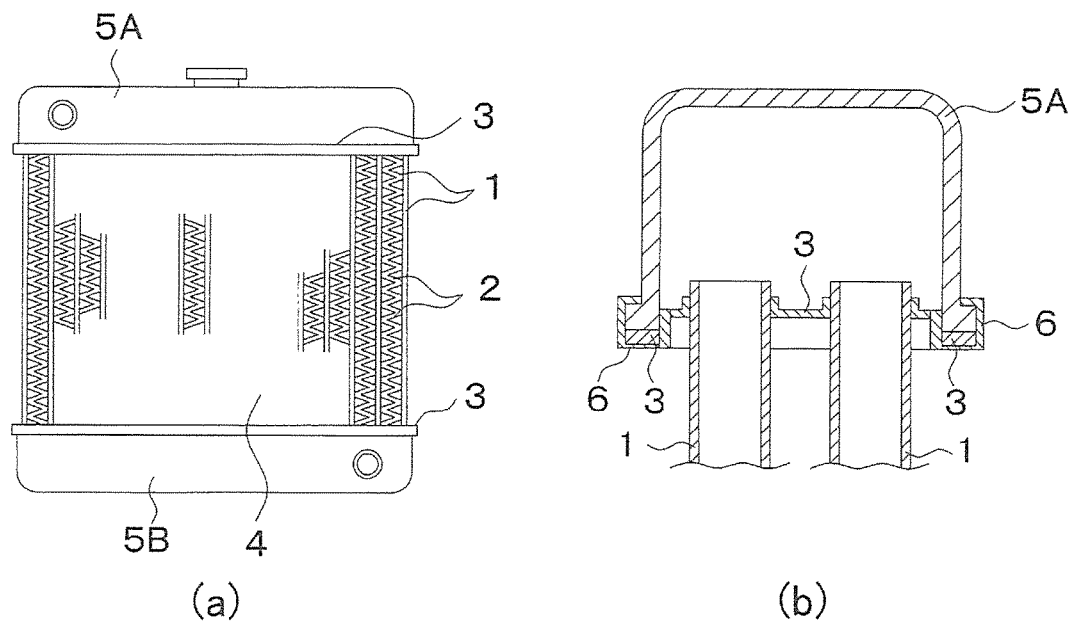

CLAD ALUMINUM ALLOY MATERIAL WITH EXCELLENT CORROSION RESISTANCE AND BRAZEABILITY AND METHOD FOR PRODUCING THE SAME

CROSS-REFERENCE TO RELATED APPLICATION

This application is a 371 application of the international PCT application serial no. PCT/JP2015/001341, filed on Mar. 11, 2015, which claims the priority benefit of Japan application no. 2014-055786, filed on Mar. 19, 2014. The entirety of each of the abovementioned patent applications is hereby incorporated by reference herein and made a part of this specification.

TECHNICAL FIELD

The present invention relates to a clad aluminum alloy material used for example as a component of a heat exchanger of an automobile or the like and to a production method thereof. More specifically, the invention relates to a clad aluminum alloy material having excellent corrosion resistance in an alkaline environment and excellent brazing property that is used as a material for a tube, a header or a pipe connected to a tube or a header, which are components of an aluminum heat exchanger such as a radiator or a heater core, and relates to a production method thereof.

BACKGROUND ART

A radiator which is a conventional automobile aluminum heat exchanger is shown in FIGS. 1(a) and (b). In the automobile aluminum heat exchanger shown in FIG. 1, a core 4 is assembled by placing fins 2 on tubes 1, in which a coolant flows, and attaching header plates 3 to the ends of the tubes 1. After brazing the core 4, the radiator is obtained by attaching resin tanks 5A and 5B to the header plates 3 through a backing 6. As the coolant of the radiator, a weak alkaline aqueous solution containing antifreeze containing an anticorrosive, namely a so-called long life coolant (LLC), and the like are used.

Regarding the materials of these components, a plate of an Al—Mn-based alloy containing Zn having a thickness of about 0.1 mm is used for the fins 2. The material used for the tubes 1 is a clad aluminum alloy material having a thickness of about 0.2 to 0.4 mm obtained by cladding an Al—Zn-based alloy as a sacrificial anode material on the coolant side of a core material of an Al—Mn-based alloy to prevent corrosion perforation due to the coolant and cladding an Al—Si-based alloy as a brazing filler metal on the side open to air. A clad aluminum alloy material having a thickness of about 1.0 to 1.3 mm and having a similar structure to that of the tubes 1 is used for the header plates 3.

The clad aluminum alloy materials used for the tubes 1 and the header plates 3 are exposed to atmosphere at about 600° C. during braze heating. Therefore, Zn added to the sacrificial anode material forms a diffusion layer of Zn in the core material. It is known that a perforation is not formed for a long time because the presence of the diffusion layer of Zn causes the corrosion caused in the sacrificial anode material in an acidic environment to spread in the lateral direction also after reaching the core material.

Although an LLC is a weak alkaline liquid containing an anticorrosive as described above, water of poor quality having no anticorrosive effect, such as well water and river water, is also sometimes used as the coolant. The water of poor quality is sometimes acidic, and in this case, corrosion is prevented by the sacrificial anode effect of the sacrificial anode material as described above.

It is known that an LLC, which is a weak alkaline liquid containing an anticorrosive, deteriorates during the use and turns into a strong alkali, thereby forming a corrosion pit in the tube material. The sacrificial anode material does not have the sacrificial anode effect on corrosion in an alkaline environment, and the corrosion advances isotropically. As a result, a perforation is formed at an early stage. Thus, various designs for preventing corrosion in an alkaline environment have been investigated.

PTL 1 proposes a clad aluminum alloy material obtained by cladding a brazing filler metal on one surface of a core material and cladding a sacrificial anode material on the other surface, wherein the sacrificial anode material is composed of an aluminum alloy which contains Ni and in which an Al—Ni-based intermetallic compound is dispersed.

In the clad aluminum alloy material, in the part of the sacrificial anode material surface where the Al—Ni-based intermetallic compound is present, deposition of aluminum hydroxide, which is the component of coating, is prevented and the coating formation is prevented. According to PTL 1, the prevention of the coating formation results in many small defects of coating, and the corrosion is dispersed. It is described that such dispersed small coating defects prevent the corrosion from advancing in the depth direction more readily than localized coating defects, and the generation of a perforation can be prevented also in an alkaline environment.

PTL 2 describes that addition of Si with Ni to the sacrificial anode material results in the formation of an Al—Ni—Si-based intermetallic compound, which is dispersed more finely and densely than an Al—Ni-based intermetallic compound, and thus better corrosion resistance in an alkaline environment is obtained.

However, the recent trend of heat exchangers is towards reduction in weight and size, and thus the thicknesses of the materials are desired to be reduced. Reducing the thicknesses of the materials means that the thickness of the sacrificial anode material is also reduced. In the two PTLs, only the sacrificial anode material has the anticorrosive effect in an alkaline environment, and once a part of a corrosion pit reaches the core material, the corrosion advances rapidly from the point. Therefore, the corrosion resistance in an alkaline environment decreases remarkably when the thickness of the sacrificial anode material is reduced.

PTLs 3 and 4 propose materials having a structure capable of exhibiting corrosion resistance even when a part of a corrosion pit reaches the core material in an alkaline environment, and the structure is obtained by adding Ni also to the core material and evenly dispersing an Al—Ni-based intermetallic compound in the core material.

However, in the materials, the core material corrodes at the same rate as the corrosion rate of the sacrificial anode material, and thus the reduction in thickness cannot be stopped at the sacrificial anode material. As a result, the materials have problems of a decrease in the strength as a clad material and a decrease in the sacrificial anode effect when the liquid turns acidic through the replacement of the coolant with water of poor quality. Also, because a large amount of a coarse Al—Ni-based intermetallic compound is contained in the core material, there are problems of a decrease in the crystal grain size after braze heating and a harmful effect on the brazing property.

CITATION LIST

Patent Literature

PTL 1: JP-A-2000-34532
PTL 2: JP-A-2003-293061
PTL 3: JP-A-2000-87170
PTL 4: JP-A-2000-96169

SUMMARY OF INVENTION

Technical Problem

In view of the problems in the conventional techniques, the invention provides a clad aluminum alloy material having excellent brazing property in which the sacrificial anode material corrodes first and the thickness is not reduced also in case of corrosion in an alkaline environment.

Solution to Problem

As a result of research, the present inventor has found that even when a conventional Al—Ni-based sacrificial anode material is used, a clad aluminum alloy material with excellent brazing property in which the sacrificial anode material corrodes first and thus the thickness is not reduced also in an alkaline environment can be obtained by suitably controlling the dispersion state of the Al—Mn—Si—Fe-based intermetallic compound in the core material.

In claim 1, the invention relates to a clad aluminum alloy material, comprising: an aluminum alloy core material, a sacrificial anode material clad on one surface of the core material and an Al—Si-based brazing filler metal clad on the other surface of the core material, wherein the core material comprises an aluminum alloy comprising Si: 0.3 to 1.5 mass %, Fe: 0.1 to 1.5 mass %, Cu: 0.2 to 1.0 mass %, Mn: 1.0 to 2.0 mass and a balance of Al and unavoidable impurities, the aluminum alloy satisfies the relation that Si content+Fe content ≥0.8 mass %, the 1-20 μm equivalent circle diameter Al—Mn—Si—Fe-based intermetallic compound density is $3.0 \times 10^5$ to $1.0 \times 10^6$ pieces/cm$^2$, and the 0.1 μm to less than 1 μm equivalent circle diameter Al—Mn—Si—Fe-based intermetallic compound density is at least $1.0 \times 10^7$ pieces/cm$^2$, and the sacrificial anode material comprises an aluminum alloy comprising Si: 0.1 to 0.6 mass %, Zn: 1.0 to 5.0 mass %, Ni: 0.1 to 2.0 mass % and a balance of Al and unavoidable impurities.

In claim 2 of the invention, the core material further comprises one or, two or more selected from Ti: 0.05 to 0.20 mass %, Zr: 0.05 to 0.20 mass %, V: 0.05 to 0.20 mass % and Cr: 0.05 to 0.20 mass %, in claim 1.

In claim 3 of the invention, the crystal grain size of the core material is at least 150 μm after brazing correspondent heating at 600° C. for three minutes, in claim 1 or 2. Also, in claim 4 of the invention, the clad aluminum alloy material has a tensile strength of at least 140 MPa after brazing correspondent heating at 600° C. for three minutes, in anyone of claims 1 to 3. Furthermore, in claim 5 of the invention, the clad aluminum alloy material has an elongation of at least 5% along the rolling direction, in any one of claims 1 to 4.

In claim 6, the invention relates to a method for producing the clad aluminum alloy material according to any one of claims 1 to 5, comprising: a step of casting the aluminum alloys for the core material, the sacrificial anode material and the brazing filler metal, respectively, a post-casting heat treatment step of soaking the core material slab at a high temperature, a cladding step of cladding the sacrificial anode material slab rolled to a predetermined thickness on one surface of the core material slab and cladding the brazing filler metal slab rolled to a predetermined thickness on the other surface, a hot clad rolling step of hot rolling the clad material, a cold rolling step of cold rolling the hot-clad-rolled clad material and an annealing step of annealing the clad material at least during the cold rolling step or after the cold rolling step, wherein the step of casting the core material slab has a casting cooling stage of cooling the slab at a rate of at least 5° C./second, the post-casting heat treatment step has a soaking stage of soaking the cooled slab at 550 to 620° C. for at least 5 hours and a cooling stage of cooling the soaked slab at a rate of at least 50° C./hour, the hot clad rolling step has a pre-rolling heating stage at 400 to 480° C. for at least 5 hours, and an annealing temperature in the annealing step is 400° C. or lower.

In claim 7 of the invention, the rolling start temperature of the hot clad rolling in claim 6 is 480 to 350° C., and the rolling finish temperature is 350 to 250, in claim 6.

Advantageous Effects of Invention

In the clad aluminum alloy material according to the invention, the dispersion state of the Al—Mn—Si—Fe-based intermetallic compound in the core material is suitably controlled. Thus, even when an Al—Ni-based aluminum alloy is used as the sacrificial anode material, the sacrificial anode material corrodes first and the thickness is not reduced also in an alkaline environment. Also, the clad aluminum alloy material has excellent brazing property.

BRIEF DESCRIPTION OF DRAWINGS

[FIG. 1] A front view (a) and a sectional view (b) showing the structure of a conventional automobile radiator.

DESCRIPTION OF EMBODIMENTS

In the clad aluminum alloy material according to the invention, the core material and the sacrificial anode material have predetermined aluminum alloy compositions, and the core material has a specific metal structure in relation to the sacrificial anode material. The clad aluminum alloy material and the production method thereof according to the invention are described in detail below. In this regard, the clad aluminum alloy material according to the invention is suitably used as a component of a heat exchanger of an automobile or the like, for example as a material for a tube, a header or a pipe connected to a tube or a header, which are components of an aluminum heat exchanger such as a radiator or a heater core.

1. Metal Structure and Mechanical Properties
1-1. Reasons for Specifying Metal Structure First, the reasons for determining the metal structure of the core material alloy according to the invention are explained. Defects of aluminum hydroxide coating are developed in the part where an Al—Ni-based intermetallic compound is present, and the corrosion is dispersed. The effect is not peculiar to an Al—Ni-based intermetallic compound, and a similar effect has been confirmed also with an Al—Mn—Fe—Si-based intermetallic compound. Here, the distribution of an Al—Ni-based intermetallic compound cannot be controlled by heat treatment such as soaking. However, the distribution of an Al—Mn—Fe—Si-based intermetallic compound can be controlled. Therefore, by controlling the dispersion state of the Al—Mn—Fe—Si-based intermetallic compound in the core material, the corrosion resistance in an alkaline environment due to Ni added to the sacrificial anode material can be further improved.

The 1 µm or more equivalent circle diameter Al—Ni-based intermetallic compound density dispersed in the sacrificial anode material is about $2.0\times10^5$ pieces/cm$^2$. Thus, by dispersing a coarse Al—Mn—Fe—Si-based intermetallic compound having an equivalent circle diameter of 1 to 20 µm more densely in the core material, more sites for the onset of corrosion are dispersed in the core material than in the sacrificial anode material when the core material is exposed to an alkaline environment. When the sites for the onset of corrosion are dispersed, the corrosion can be prevented from advancing in the thickness direction. As a result, the corrosion of the sacrificial anode material advances first, and the sacrificial anticorrosion effect of the sacrificial anode material is obtained. However, when such a coarse intermetallic compound is dispersed at a high density in the core material before braze heating, the crystal grains become very fine after braze heating, and the brazing property is adversely affected. In order to avoid the adverse effect, an attempt has been made to coarsen the crystal grains after braze heating by dispersing a fine Al—Mn—Fe—Si-based intermetallic compound having an equivalent circle diameter of 0.1 µm to less than 1 µm in the core material before braze heating. In the invention, the equivalent circle diameter means the diameter of the equivalent circle.

1-2. The 1 to 20 µm Equivalent Circle Diameter Al—Mn—Si—Fe-Based Intermetallic Compound Density in Core Material Before Brazing The Al—Mn—Si—Fe-based intermetallic compound having an equivalent circle diameter of 1 to 20 µm in the core material is a crystallized compound mainly formed during solidification in casting. As described above, aluminum hydroxide coating is not formed in the part where such a coarse Al—Mn—Si—Fe-based intermetallic compound is present, like an Al—Ni-based intermetallic compound, and the corrosion is dispersed. As a result, an effect of preventing the corrosion from advancing in the thickness direction is exhibited. Such an effect cannot be obtained with an Al—Mn—Si—Fe-based intermetallic compound having an equivalent circle diameter of less than 1 µm, and thus the intermetallic compound having an equivalent circle diameter of less than 1 µm is excluded. Similarly, the effect cannot be obtained with an Al—Mn—Fe—Si-based intermetallic compound having an equivalent circle diameter of more than 20 µm, and thus the intermetallic compound is excluded.

The Al—Ni-based intermetallic compound density dispersed in the sacrificial anode material is about $2.0\times10^5$ pieces/cm$^2$. When an Al—Mn—Fe—Si-based intermetallic compound having an equivalent circle diameter of 1 to 20 µm was dispersed in the core material at a density 1.5 times or more as high as the density of the Al—Ni-based intermetallic compound, a significantly higher number of sites for the onset of corrosion than in the sacrificial anode material were dispersed upon exposure of the core material to an alkaline environment. As a result, the corrosion of the sacrificial anode material advanced first, and the sacrificial anticorrosion effect of the sacrificial anode material was observed. Such an effect suggests that the 1 to 20 µm equivalent circle diameter Al—Mn—Fe—Si-based intermetallic compound density in the core material of less than $3.0\times10^5$ pieces/cm$^2$, which corresponds to the density 1.5 times as high as the density of the Al—Ni-based intermetallic compound, is not sufficient. When the 1 to 20 µm equivalent circle diameter Al—Mn—Fe—Si-based intermetallic compound density in the core material exceeds $1.0\times10^6$ pieces/cm$^2$, however, the processability decreases. Therefore, the 1 to 20 µm equivalent circle diameter Al—Mn—Fe—Si-based intermetallic compound density in the core material is defined as $3.0\times10^5$ to $1.0\times10^6$ pieces/cm$^2$, preferably $3.3\times10^5$ to $9.5\times10^5$ pieces/cm$^2$.

1-3. The 0.1 µm to Less than 1 µm Equivalent Circle Diameter Al—Mn—Si—Fe-Based Intermetallic Compound Density in Core Material Before Brazing When a coarse Al—Mn—Fe—Si-based intermetallic compound having an equivalent circle diameter of 1 to 20 µm is dispersed in the core material at a high density, the number of sites which can become nuclei of recrystallization during braze heating increases, and as a result, the crystal grain size during braze heating decreases. When the crystal grains are small during braze heating, the brazing property decreases. In order to prevent the crystal grains from becoming fine, it is effective to disperse an Al—Mn—Fe—Si-based intermetallic compound having an equivalent circle diameter of 0.1 µm to less than 1 µm finely in the core material and reduce the sites which become nuclei of recrystallization during braze heating. An Al—Mn—Si—Fe-based intermetallic compound having an equivalent circle diameter of less than 0.1 µm diffuses and forms a solid solution during braze heating and thus does not exhibit any effect on the reduction in the nuclei of recrystallization, and thus the intermetallic compound is excluded. Also, an Al—Mn—Fe—Si-based intermetallic compound having an equivalent circle diameter of 1 µm or more becomes nuclei of recrystallization and thus is excluded from the viewpoint of reducing the sites that serve as nuclei of recrystallization.

In the invention, in order that the sacrificial anode material can exhibit a sacrificial anticorrosion effect also in an alkaline environment, it is necessary to disperse a coarse Al—Mn—Fe—Si-based intermetallic compound having an equivalent circle diameter of 1 to 20 µm in the core material at a very high density of $3.0\times10^5$ to $1.0\times10^6$ pieces/cm$^2$. It was found that when a relatively fine Al—Mn—Fe—Si-based intermetallic compound having an equivalent circle diameter of 0.1 µm to less than 1 µm is present in the core material only at less than $1.0\times10^7$ piece/cm$^2$, however, the mean crystal grain size after braze heating does not reach 150 µm, which is considered to mean excellent brazing. For this reason, the 0.1 µm to less than 1 µm equivalent circle diameter Al—Mn—Si—Fe-based intermetallic compound density in the core material is defined as at least $1.0\times10^7$ pieces/cm$^2$, preferably at least $1.5\times10^7$ pieces/cm$^2$. The upper limit of the density depends on the composition of the core material, the production method and the like but is $5.0\times10^9$ pieces/cm$^2$ in the invention.

The densities of the Al—Mn—Fe—Si-based intermetallic compounds of the respective sizes in the core material were determined by selecting measurement points in the sample, observing the points with a scanning electron microscope (SEM) and analyzing the SEM images obtained. Each density is determined as an arithmetic mean of the results of the measurements.

1-4. Crystal Grain Size of Core Material after Brazing

When the clad aluminum alloy material according to the invention is subjected to heat treatment at 600° C. for three minutes, which corresponds to braze heating, the crystal grain size of the core material is preferably at least 150 µm, more preferably at least 160 µm. The upper limit thereof depends on the composition of the core material, the production method and the like but is 300 µm in the invention.

1-5. Strength of Clad Material after Brazing

When the clad aluminum alloy material according to the invention is subjected to heat treatment at 600° C. for three minutes, which corresponds to braze heating, the tensile strength thereof is preferably at least 140 MPa, more preferably at least 150 MPa. The upper limit thereof depends on the composition of the core material, the production method and the like but is 220 MPa in the invention.

1-6. Elongation of Clad Material

The clad aluminum alloy material according to the invention has an elongation of at least 5%, more preferably at least 8%, as the elongation along the rolling direction. The upper limit thereof depends on the composition of the core material, the production method and the like but is 20% in the invention.

2. Alloy Compositions

With respect to the compositions of the Al alloys of the respective components according to the invention, the meanings of the additional elements and the reasons for limiting the content ranges are explained.

2-1. Core Material

The aluminum alloy of the core material contains Si, Fe, Cu and Mn as essential elements and Ti, Zr, V and Cr as optional additional elements.

Si added to the core material exhibits an effect of improving the strength of the core material. The Si content is 0.3 to 1.5 mass % (simply referred to as "%" below). When the content is less than 0.3%, the effect is not sufficient, while when the content exceeds 1.5%, the melting point of the core material decreases and the core material easily melts locally during brazing. A preferable Si content is 0.5 to 1.2%.

Fe added to the core material crystallizes and precipitates as an intermetallic compound with Mn and contributes to dispersion strengthening. The Fe content is 0.1 to 1.5%. When the content is less than 0.1%, the contribution is not sufficient, while the processability decreases when the content exceeds 1.5%. A preferable Fe content is 0.2 to 0.8%.

In addition to the above effects, Si and Fe added to the core material form intermetallic compounds of various sizes with Mn and exhibit effects of improving the corrosion resistance in an alkaline environment and the brazing property. The larger the sum of the Si content and the Fe content is, the more significant the effects are. The sum of the Si content and the Fe content is 0.8% or more, preferably 0.9% or more. When the sum is less than 0.8, the effects cannot be obtained sufficiently. From the viewpoint of obtaining the effects, the upper limit of the sum of the Si content and the Fe content is preferably 2.5%.

Cu added to the core material exhibits an effect of greatly improving the strength of the material by diffusing into the parent phase to form a solid solution. The Cu content is 0.2 to 1.0%. When the content is less than 0.2%, the effect is not sufficient, while when the content exceeds 1.0%, an intermetallic compound of $Al_2Cu$ precipitates at the grain boundary and a PFZ (precipitate free zone) is created around the grain boundary, resulting in grain boundary corrosion. A preferable Cu content is 0.3 to 0.8%.

Mn added to the core material forms intermetallic compounds of various sizes with Si and Fe and contributes to dispersion strengthening. Also, Mn improves the corrosion resistance in an alkaline environment and the brazing property. Moreover, because Mn has an effect of shifting the potential of the core material in the more noble direction, Mn can widen the potential difference from the sacrificial anode material and also improves the corrosion resistance in an acidic environment. The Mn content is 1.0 to 2.0%. When the content is less than 1.0%, the effects are not sufficient, while when the content exceeds 2.0%, a coarse crystallized product is formed and the yield of production decreases. A preferable Mn content is 1.2 to 1.8%.

Cr and Zr added to the core material each form a fine intermetallic compound in the aluminum alloy and exhibit an effect of improving the strength. When the contents are less than 0.05%, the effect is not sufficient, while when the contents exceed 0.20%, coarse intermetallic compounds are formed and the formability of the aluminum alloy material decreases. Therefore, the Cr and Zr contents are each preferably 0.05 to 0.20%. More preferable ranges of the Cr and Zr contents are each 0.05 to 0.15%.

Ti and V added to the core material each form a fine intermetallic compound in the aluminum alloy and exhibit an effect of improving the strength. The dispersion patterns of the intermetallic compounds are layers. Because the potentials of the intermetallic compounds are noble, the corrosion pattern in an acidic environment becomes layered corrosion, and an effect of preventing the corrosion from advancing in the depth direction is exhibited. When the contents thereof are less than 0.05%, the effects are not sufficient, while when the contents exceed 0.20%, coarse intermetallic compounds are formed and the formability decreases. Therefore, the Ti and V contents are each preferably 0.05 to 0.20%. More preferable ranges of the Ti and V contents are each 0.05 to 0.15%.

One or optional two or more of Ti, Zr, V and Cr are selected and added. Also, in addition to the essential elements and the optional additional elements, the core material may contain unavoidable impurities such as Zn, Ni and Sn each in an amount of 0.05% or less and in a total amount of 0.15% or less.

2-2. Sacrificial Anode Material

The aluminum alloy of the sacrificial anode material contains Si, Zn and Ni as essential elements.

Zn added to the sacrificial anode material exhibits effects of shifting the potential of the sacrificial anode material in the less noble direction, improving the sacrificial anticorrosion effect to protect the core material and preventing the corrosion of the core material in an acidic environment. The Zn content is 1.0 to 5.0%. When the content is less than 1.0%, the sacrificial anticorrosion effect is not sufficient, while when the content exceeds 5.0%, the corrosion rate increases and the corrosion resistance deteriorates. A preferable Zn content is 2.0 to 5.0%.

Ni added to the sacrificial anode material forms an Al—Ni-based intermetallic compound. In the part where the intermetallic compound is present, the deposition of aluminum hydroxide, which is the component of coating, is prevented, and the coating formation is prevented. As a result, there are many small coating defects, and the corrosion is dispersed. Then, the corrosion is prevented from advancing in the depth direction more readily than in the case where coating defects are localized, and the generation of a perforation is prevented also in an alkaline environment. The Ni content is 0.1 to 2.0%. When the content is less than 0.1%, the effect is not sufficient, while when the content exceeds 2.0%, the Al—Ni-based intermetallic compound is coarsened and the processability decreases. A preferable Ni content is 0.5 to 1.5%.

Si added to the sacrificial anode material forms an Al—Si—Ni-based intermetallic compound with Ni. Because the Al—Si—Ni intermetallic compound is dispersed more finely than an Al—Ni-based intermetallic compound, Si exhibits effects of further dispersing the corrosion in an alkaline environment and preventing the corrosion from advancing in the thickness direction. The Si content is 0.1 to 0.6%. When the content is less than 0.1%, the effects are not sufficient, while when the content exceeds 0.6%, the corrosion rate of the sacrificial anode material increases. A preferable Si content is 0.2 to 0.5%.

In addition to the essential elements, the sacrificial anode material may contain unavoidable impurities such as Zr, Cr and V each in an amount of 0.05% or less and in a total amount of 0.15% or less.

2-3. Brazing Filler Metal

For the brazing filler metal used for the clad aluminum alloy material according to the invention, an aluminum alloy that is generally used for brazing an aluminum alloy can be used. The aluminum alloy is for example Al-5.0-12.0% Si-based alloy, Al-5.0-12.0% Si-0.05-5.0% Zn-based alloy, Al-5.0-12.0% Si-0.05-5.0% Mg (Bi)-based alloy or the like.

3. Production Method

Next, the method for producing the clad aluminum alloy material for a heat exchanger according to the invention is explained.

3-1. Casting Step

First, casting of the core material slab is explained. An aluminum alloy material having the predetermined composition is melted, and a slab for the core material is produced by the DC (Direct Chill) casting method. In the DC casting method, the casting cooling rate during the solidification of the molten metal is generally very high, namely 0.5 to 20° C./second. However, in order to crystallize an Al—Mn—Fe—Si-based intermetallic compound at a high density, it is necessary to control the casting cooling rate to 5° C./second or more, preferably 8° C./second or more. The upper limit of the cooling rate is limited by the size of the slab or the like but is preferably 15° C./second in the invention.

Because casting is conducted at such a high casting cooling rate, although an Al—Mn—Fe—Si-based intermetallic compound is crystallized at a high density, the equivalent circle diameter thereof is smaller than a general equivalent circle diameter, and an Al—Mn—Fe—Si-based intermetallic compound of less than 1 μm is also formed. Also, because the cooling rate is fast, a fine Al—Mn—Fe—Si-based intermetallic compound having an equivalent circle diameter of less than 0.1 μm is also dispersed at a high density.

3-2. Post-Casting Heat Treatment Step 3-2-1. Holding Stage During Soaking

Therefore, by soaking the slab at 550 to 620° C. for five hours or longer after casting, the fine Al—Mn—Fe—Si-based intermetallic compound having an equivalent circle diameter of less than 0.1 μm is diffused to form a solid solution, and Ostwald ripening which further coarsens a coarse Al—Mn—Fe—Si-based intermetallic compound of more than 0.1 μm is promoted. As a result, the number density of a coarse Al—Mn—Fe—Si-based intermetallic compound having an equivalent circle diameter of 1 to 20 μm can be controlled to $3.0 \times 10^5$ to $1.0 \times 10^6$ pieces/cm$^2$.

When the soaking temperature is lower than 550° C., the fine Al—Mn—Fe—Si-based intermetallic compound having an equivalent circle diameter of less than 0.1 μm cannot fully diffuse into the parent phase to form a solid solution, and the number density of the coarse Al—Mn—Fe—Si-based intermetallic compound having an equivalent circle diameter of 1 to 20 μm becomes less than $3.0 \times 10^5$ pieces/cm$^2$. When the soaking temperature exceeds 620° C., the core material melts partially, and a homogeneous material cannot be produced. A preferable soaking temperature is 580 to 610° C.

When the soaking period is shorter than five hours, the fine Al—Mn—Fe—Si-based intermetallic compound having an equivalent circle diameter of less than 0.1 μm cannot fully diffuse into the parent phase to form a solid solution, and the number density of the coarse Al—Mn—Fe—Si-based intermetallic compound having an equivalent circle diameter of 1 to 20 μm becomes less than $3.0 \times 10^5$ pieces/cm$^2$. Therefore, the soaking period is five hours or longer, preferably eight hours or longer. The upper limit of the soaking period is not particularly limited. However, when the treatment is conducted for 20 hours or longer, the effect is saturated, and the treatment is uneconomical. Thus, the upper limit is preferably 20 hours.

3-2-2. Cooling Stage after Soaking

After soaking, the slab is cooled at a cooling rate of 50° C./hour or more. Because the soaking treatment is conducted at a temperature as high as 550 to 620° C. as described above, a large amount of the additional elements diffuse into the parent phase to form a solid solution in the soaking stage. Such solid solution state in a large amount can be maintained by conducting the cooling stage after soaking at a high rate. After the cooling stage, through the heating stage (at 400 to 480° C. for five hours or longer) before hot clad rolling described below, a fine Al—Mn—Fe—Si-based intermetallic compound having an equivalent circle diameter of 0.1 μm or more and less than 1 μm can be precipitated. The rate of cooling after soaking is preferably 70° C./hour or more. The upper limit of the cooling rate is limited by the size of the slab or the like but is preferably 110° C./hour in the invention.

The temperature of the heating stage before hot clad rolling, which is described in detail below, is 400 to 480° C. When the temperature exceeds 480° C., the coarse Al—Mn—Fe—Si-based intermetallic compound having an equivalent circle diameter of 1 to 20 μm further grows due to the oversaturated additional elements in the solid solution. On the other hand, at a temperature of 480° C. or lower, a fine Al—Mn—Fe—Si-based intermetallic compound having an equivalent circle diameter of 0.1 μm or more and less than 1 μm precipitates newly and closely. Thus, when the rate of cooling after soaking is less than 50° C./hour, the elements in the solid solution are used for the growth of the coarse Al—Mn—Fe—Si-based intermetallic compound having an equivalent circle diameter of 1 to 20 μm during cooling from the soaking temperature to 480° C., and the number of the pieces of the fine Al—Mn—Fe—Si-based intermetallic compound having an equivalent circle diameter of 0.1 μm or more and less than 1 μm that precipitate in the heating stage before hot clad rolling becomes small.

3-3. Cladding Step

Next, the slabs for the sacrificial anode material and for the brazing filler metal are cast by the general DC casting method, and soaking and subsequent cooling after cooling of casting are not conducted. The slabs for the sacrificial anode material and for the brazing filler metal obtained are hot rolled to predetermined thicknesses at a temperature of 500 to 250° C. Then, the sacrificial anode material slab which has been rolled to a predetermined thickness is clad on one of the surfaces of the core material slab which has been cooled after soaking, and the brazing filler metal slab which has been rolled to a predetermined thickness is clad on the other surface.

3-4. Hot Clad Rolling Step 3-4-1. Pre-Rolling Heating Stage

The clad material obtained in the cladding step is then subjected to a pre-rolling heating stage in a hot clad rolling step. In the pre-rolling heating stage, the slab is treated with heat at 400 to 480° C. for five hours or longer. When the temperature of the pre-rolling heating stage exceeds 480° C., the fine Al—Mn—Fe—Si-based intermetallic compound having an equivalent circle diameter of 0.1 µm or more and less than 1 µm does not precipitate in the pre-rolling heating stage as described above. When the temperature of the pre-rolling heating stage is lower than 400° C., the diffusion is not sufficient for a new compound to precipitate and the fine Al—Mn—Fe—Si-based intermetallic compound having an equivalent circle diameter of 0.1 µm or more and less than 1 µm does not precipitate, either. When the holding period of the pre-rolling heating stage is shorter than five hours, the number density of the fine Al—Mn—Fe—Si-based intermetallic compound having an equivalent circle diameter of 0.1 µm or more and less than 1 µm does not reach $1.0 \times 10^7$ pieces/cm². The upper limit of the holding period is not particularly limited. However, when the treatment is conducted for 10 hours or longer, the effect is saturated, and the treatment is uneconomical. Thus, the upper limit is preferably 10 hours.

3-4-2. Hot Clad Rolling Stage

The clad material is subjected to hot clad rolling after the pre-rolling heating stage. The hot clad rolling is conducted under general conditions, for example at a rolling start temperature of 480 to 350° C. and a rolling finish temperature of 350 to 250° C.

3-5. Cold Rolling Step and Annealing Step

After the hot clad rolling step, the rolled plate is subjected to a cold rolling step. The cold rolling step is conducted under general conditions. The clad material is subjected to an annealing step at least during the cold rolling step (process annealing) or after the cold rolling step (final annealing). The annealing temperature is 200° C. or higher and 400° C. or lower. When the temperature of process annealing or final annealing exceeds 400° C., the additional elements of the core material diffuse into the sacrificial anode material and the brazing filler metal. As a result, the fine Al—Mn—Fe—Si-based intermetallic compound having an equivalent circle diameter of 0.1 µm or more and less than 1 µm diffuses again to form a solid solution, and the number density of the intermetallic compound becomes less than $1.0 \times 10^7$ pieces/cm². On the other hand, the core material structure is not softened sufficiently at an annealing temperature of lower than 200° C., and the effects of annealing are not obtained. The annealing period is preferably one to five hours in case of batch annealing, and the holding period is preferably 0 to 60 seconds in case of continuous annealing. Here, a holding period of 0 second means that cooling is started immediately after the temperature has reached a desired annealing temperature.

Predetermined effects are exhibited when a heat exchanger is produced by a general production method with the clad aluminum material produced by the above steps.

EXAMPLES

Next, the invention is explained in further detail based on Examples, but the invention is not limited to the Examples.

Slabs of core material alloys having the compositions shown in Table 1, sacrificial anode material alloys having the compositions shown in Table 2 and 4045 alloy were cast by continuous casting. The cooling rates during casting of the core materials here were as shown in Table 3. In Table 1 and Table 2, "—" in the columns of alloy composition indicates that the value was not larger than the detection limit, and the "balance" contains unavoidable impurities.

TABLE 1

| Core Material | Alloy No. | Alloy Composition (mass %) | | | | | | | | | |
|---|---|---|---|---|---|---|---|---|---|---|---|
| | | Si | Fe | Cu | Mn | Ti | Zr | V | Cr | Al | Si + Fe |
| Within the scope of the invention | 1 | 0.3 | 0.8 | 0.6 | 1.5 | — | — | — | — | Balance | 1.1 |
| | 2 | 1.0 | 0.8 | 0.6 | 1.5 | — | — | — | — | Balance | 1.8 |
| | 3 | 1.5 | 0.8 | 0.6 | 1.5 | — | — | — | — | Balance | 2.3 |
| | 4 | 1.0 | 0.1 | 0.6 | 1.5 | — | — | — | — | Balance | 1.1 |
| | 5 | 1.0 | 1.5 | 0.6 | 1.5 | — | — | — | — | Balance | 2.5 |
| | 6 | 1.0 | 0.8 | 0.2 | 1.5 | — | — | — | — | Balance | 1.8 |
| | 7 | 1.0 | 0.8 | 1.0 | 1.5 | — | — | — | — | Balance | 1.8 |
| | 8 | 1.0 | 0.8 | 0.6 | 1.0 | — | — | — | — | Balance | 1.8 |
| | 9 | 1.0 | 0.8 | 0.6 | 2.0 | — | — | — | — | Balance | 1.8 |
| | 10 | 1.0 | 0.8 | 0.6 | 1.5 | 0.05 | — | — | — | Balance | 1.8 |
| | 11 | 1.0 | 0.8 | 0.6 | 1.5 | 0.10 | — | — | — | Balance | 1.8 |
| | 12 | 1.0 | 0.8 | 0.6 | 1.5 | 0.20 | — | — | — | Balance | 1.8 |
| | 13 | 1.0 | 0.8 | 0.6 | 1.5 | — | 0.05 | — | — | Balance | 1.8 |
| | 14 | 1.0 | 0.8 | 0.6 | 1.5 | — | 0.10 | — | — | Balance | 1.8 |
| | 15 | 1.0 | 0.8 | 0.6 | 1.5 | — | 0.20 | — | — | Balance | 1.8 |
| | 16 | 1.0 | 0.8 | 0.6 | 1.5 | — | — | 0.05 | — | Balance | 1.8 |
| | 17 | 1.0 | 0.8 | 0.6 | 1.5 | — | — | 0.10 | — | Balance | 1.8 |
| | 18 | 1.0 | 0.8 | 0.6 | 1.5 | — | — | 0.20 | — | Balance | 1.8 |
| | 19 | 1.0 | 0.8 | 0.6 | 1.5 | — | — | — | 0.05 | Balance | 1.8 |
| | 20 | 1.0 | 0.8 | 0.6 | 1.5 | — | — | — | 0.10 | Balance | 1.8 |
| | 21 | 1.0 | 0.8 | 0.6 | 1.5 | — | — | — | 0.20 | Balance | 1.8 |
| | 22 | 0.6 | 0.2 | 0.6 | 1.5 | — | — | — | — | Balance | 0.8 |
| Outside the scope of the invention | 23 | 0.2 | 0.8 | 0.6 | 1.5 | — | — | — | — | Balance | 1 |
| | 24 | 1.6 | 0.8 | 0.6 | 1.5 | — | — | — | — | Balance | 2.4 |
| | 25 | 1.0 | 0.09 | 0.6 | 1.5 | — | — | — | — | Balance | 1.09 |
| | 26 | 1.0 | 1.6 | 0.6 | 1.5 | — | — | — | — | Balance | 2.6 |
| | 27 | 1.0 | 0.8 | 0.1 | 1.5 | — | — | — | — | Balance | 1.8 |
| | 28 | 1.0 | 0.8 | 1.1 | 1.5 | — | — | — | — | Balance | 1.8 |
| | 29 | 1.0 | 0.8 | 0.6 | 0.9 | — | — | — | — | Balance | 1.8 |
| | 30 | 1.0 | 0.8 | 0.6 | 2.1 | — | — | — | — | Balance | 1.8 |
| | 31 | 1.0 | 0.8 | 0.6 | 1.5 | 0.25 | — | — | — | Balance | 1.8 |

TABLE 1-continued

| Core Material Alloy No. | Alloy Composition (mass %) | | | | | | | | | |
|---|---|---|---|---|---|---|---|---|---|---|
| | Si | Fe | Cu | Mn | Ti | Zr | V | Cr | Al | Si + Fe |
| 32 | 1.0 | 0.8 | 0.6 | 1.5 | — | 0.25 | — | — | Balance | 1.8 |
| 33 | 1.0 | 0.8 | 0.6 | 1.5 | — | — | 0.25 | — | Balance | 1.8 |
| 34 | 1.0 | 0.8 | 0.6 | 1.5 | — | — | — | 0.25 | Balance | 1.8 |
| 35 | 0.5 | 0.2 | 0.6 | 1.5 | — | — | — | — | Balance | 0.7 |

TABLE 2

| | Sacrificial Material Alloy No. | Alloy Composition (mass %) | | | |
|---|---|---|---|---|---|
| | | Si | Zn | Ni | Al |
| Within the scope of the invention | 1 | 0.1 | 3.0 | 1.0 | Balance |
| | 2 | 0.4 | 3.0 | 1.0 | Balance |
| | 3 | 0.6 | 3.0 | 1.0 | Balance |
| | 4 | 0.4 | 1.0 | 1.0 | Balance |
| | 5 | 0.4 | 3.0 | 1.0 | Balance |
| | 6 | 0.4 | 5.0 | 1.0 | Balance |
| | 7 | 0.4 | 3.0 | 0.1 | Balance |
| | 8 | 0.4 | 3.0 | 1.0 | Balance |
| | 9 | 0.4 | 3.0 | 2.0 | Balance |
| Outside the scope of the invention | 10 | 0.09 | 3.0 | 1.0 | Balance |
| | 11 | 0.7 | 3.0 | 1.0 | Balance |
| | 12 | 0.4 | 0.9 | 1.0 | Balance |
| | 13 | 0.4 | 5.1 | 1.0 | Balance |
| | 14 | 0.4 | 3.0 | 0.09 | Balance |
| | 15 | 0.4 | 3.0 | 2.1 | Balance | ture of 300° C.). The conditions of the pre-rolling heating stage before hot cladding are also shown in Table 3. Then, the clad plates thus obtained were subjected to a cold rolling step, an annealing step (process annealing) and a cold rolling step in this order, and final plates (H14) having a thickness of 0.25 mm were obtained. The process annealing was batch type, and the annealing temperatures are shown in Table 3. The annealing period was three hours. The cladding rates of the sacrificial anode materials and the brazing filler metals were 15% and 10%, respectively. In the above manner, clad material samples were produced.

"The density of an Al—Mn—Fe—Si-based intermetallic compound (1 to 20 μm)", "the density of an Al—Mn—Fe—Si-based precipitate (0.1 μm or more and less than 1 μm)", "the crystal grain size after brazing correspondent heating (the crystal grain size after NB correspondent heating)", "the

TABLE 3

| | Step No. | Casting Cooling Rate | Soaking Stage | | Cooling Stage Cooling Rate | Pre-rolling Heating Stage | | Process Annealing Step Holding Temperature | Final Annealing Step Holding Temperature |
|---|---|---|---|---|---|---|---|---|---|
| | | | Holding Temperature | Holding Period | | Holding Temperature | Holding Period | | |
| Within the scope of the invention | 1 | 5° C./sec | 590° C. | 10 hr | 70° C./hr | 440° C. | 7 hr | 360° C. | — |
| | 2 | 10° C./sec | 590° C. | 10 hr | 70° C./hr | 440° C. | 7 hr | 360° C. | — |
| | 3 | 20° C./sec | 590° C. | 10 hr | 70° C./hr | 440° C. | 7 hr | 360° C. | — |
| | 4 | 10° C./sec | 550° C. | 10 hr | 70° C./hr | 440° C. | 7 hr | 360° C. | — |
| | 5 | 10° C./sec | 620° C. | 10 hr | 70° C./hr | 440° C. | 7 hr | 360° C. | — |
| | 6 | 10° C./sec | 590° C. | 5 hr | 70° C./hr | 440° C. | 7 hr | 360° C. | — |
| | 7 | 10° C./sec | 590° C. | 10 hr | 50° C./hr | 440° C. | 7 hr | 360° C. | — |
| | 8 | 10° C./sec | 590° C. | 10 hr | 70° C./hr | 400° C. | 7 hr | 360° C. | — |
| | 9 | 10° C./sec | 590° C. | 10 hr | 70° C./hr | 480° C. | 7 hr | 360° C. | — |
| | 10 | 10° C./sec | 590° C. | 10 hr | 70° C./hr | 440° C. | 5 hr | 360° C. | — |
| | 11 | 10° C./sec | 590° C. | 10 hr | 70° C./hr | 440° C. | 7 hr | 400° C. | — |
| | 12 | 10° C./sec | 590° C. | 10 hr | 70° C./hr | 440° C. | 7 hr | — | 270° C. |
| | 13 | 10° C./sec | 590° C. | 10 hr | 70° C./hr | 440° C. | 7 hr | 360° C. | 270° C. |
| Outside the scope of the invention | 14 | 4° C./sec | 590° C. | 10 hr | 70° C./hr | 440° C. | 7 hr | 360° C. | — |
| | 15 | 10° C./sec | 540° C. | 10 hr | 70° C./hr | 440° C. | 7 hr | 360° C. | — |
| | 16 | 10° C./sec | 630° C. | 10 hr | 70° C./hr | 440° C. | 7 hr | 360° C. | — |
| | 17 | 10° C./sec | 590° C. | 4 hr | 70° C./hr | 440° C. | 7 hr | 360° C. | — |
| | 18 | 10° C./sec | 590° C. | 10 hr | 45° C./hr | 440° C. | 7 hr | 360° C. | — |
| | 19 | 10° C./sec | 590° C. | 10 hr | 70° C./hr | 390° C. | 7 hr | 360° C. | — |
| | 20 | 10° C./sec | 590° C. | 10 hr | 70° C./hr | 490° C. | 7 hr | 360° C. | — |
| | 21 | 10° C./sec | 590° C. | 10 hr | 70° C./hr | 440° C. | 4 hr | 360° C. | — |
| | 22 | 10° C./sec | 590° C. | 10 hr | 70° C./hr | 440° C. | 7 hr | 410° C. | — |

The core material slabs were further soaked under the conditions shown in Table 3. Next, the slabs were cooled at the cooling rates shown in Table 3. Then, the sacrificial anode material slabs and the brazing filler metal slabs were hot rolled at 480° C. to predetermined thicknesses and combined with the respective core material slabs, and the combined materials were subjected to hot clad rolling (rolling start temperature of 470° C. and rolling finish temperatensile strength after brazing correspondent heating (the TS after NB correspondent heating)", "the formability", "the corrosion resistance (in an acidic environment)" and "the corrosion resistance (in an alkaline environment)" of each of the clad material samples were evaluated by the methods described below. The results are shown in Tables 4 to 6. Regarding the evaluation, the brazing correspondent heating means heat treatment at 600° C. for three minutes.

TABLE 4

| Sample No. | | Core Material Alloy No. | Sacrificial Material Alloy No. | Step No. | Density of Al—Mn—Fe—Si-based Intermetallic Compound (1-20 μm) [pieces/cm²] | Density of Al—Mn—Fe—Si-based Intermetallic Compound (0.1 μm or more and less than 1 μm) [pieces/cm²] | Crystal Grain Size after NB Correspondent Heating [μm] | TS after NB Correspondent Heating [MPa] | Formability | Corrosion Resistance (in acidic environment) | Corrosion Resistance (in alkaline environment) |
|---|---|---|---|---|---|---|---|---|---|---|---|
| Example of the Invention | 1 | 1 | 2 | 2 | $5.1 \times 10^5$ | $1.8 \times 10^7$ | 201 | 145 | Excellent | Excellent | Excellent |
| | 2 | 2 | 2 | 2 | $6.2 \times 10^5$ | $2.5 \times 10^7$ | 193 | 155 | Excellent | Excellent | Excellent |
| | 3 | 3 | 2 | 2 | $7.0 \times 10^5$ | $3.3 \times 10^7$ | 188 | 166 | Excellent | Excellent | Excellent |
| | 4 | 4 | 2 | 2 | $4.2 \times 10^5$ | $1.6 \times 10^7$ | 211 | 147 | Excellent | Excellent | Excellent |
| | 5 | 5 | 2 | 2 | $9.3 \times 10^5$ | $3.8 \times 10^7$ | 163 | 161 | Excellent | Excellent | Excellent |
| | 6 | 6 | 2 | 2 | $6.3 \times 10^5$ | $2.3 \times 10^7$ | 195 | 143 | Excellent | Excellent | Excellent |
| | 7 | 7 | 2 | 2 | $6.3 \times 10^5$ | $2.4 \times 10^7$ | 189 | 169 | Excellent | Excellent | Excellent |
| | 8 | 8 | 2 | 2 | $5.1 \times 10^5$ | $1.9 \times 10^7$ | 208 | 146 | Excellent | Excellent | Excellent |
| | 9 | 9 | 2 | 2 | $6.9 \times 10^5$ | $3.1 \times 10^7$ | 172 | 159 | Excellent | Excellent | Excellent |
| | 10 | 10 | 2 | 2 | $5.9 \times 10^5$ | $2.3 \times 10^7$ | 179 | 158 | Excellent | Excellent | Excellent |
| | 11 | 11 | 2 | 2 | $6.1 \times 10^5$ | $2.5 \times 10^7$ | 174 | 161 | Excellent | Excellent | Excellent |
| | 12 | 12 | 2 | 2 | $6.2 \times 10^5$ | $2.8 \times 10^7$ | 167 | 167 | Excellent | Excellent | Excellent |
| | 13 | 13 | 2 | 2 | $6.1 \times 10^5$ | $2.6 \times 10^7$ | 177 | 156 | Excellent | Excellent | Excellent |
| | 14 | 14 | 2 | 2 | $5.9 \times 10^5$ | $2.4 \times 10^7$ | 170 | 162 | Excellent | Excellent | Excellent |
| | 15 | 15 | 2 | 2 | $6.2 \times 10^5$ | $2.5 \times 10^7$ | 168 | 164 | Excellent | Excellent | Excellent |
| | 16 | 16 | 2 | 2 | $6.4 \times 10^5$ | $2.2 \times 10^7$ | 185 | 159 | Excellent | Excellent | Excellent |
| | 17 | 17 | 2 | 2 | $6.5 \times 10^5$ | $2.2 \times 10^7$ | 179 | 163 | Excellent | Excellent | Excellent |
| | 18 | 18 | 2 | 2 | $6.2 \times 10^5$ | $2.5 \times 10^7$ | 177 | 164 | Excellent | Excellent | Excellent |
| | 19 | 19 | 2 | 2 | $6.1 \times 10^5$ | $2.3 \times 10^7$ | 181 | 156 | Excellent | Excellent | Excellent |
| | 20 | 20 | 2 | 2 | $6.2 \times 10^5$ | $2.3 \times 10^7$ | 172 | 159 | Excellent | Excellent | Excellent |
| | 21 | 21 | 2 | 2 | $6.5 \times 10^5$ | $2.7 \times 10^7$ | 165 | 161 | Excellent | Excellent | Excellent |
| | 22 | 22 | 2 | 2 | $3.3 \times 10^5$ | $1.3 \times 10^7$ | 215 | 143 | Excellent | Excellent | Excellent |
| Comparative Example | 23 | 23 | 2 | 2 | $4.6 \times 10^5$ | $1.5 \times 10^7$ | 201 | 138 | Excellent | Excellent | Excellent |
| | 24 | 24 | 2 | 2 | $7.3 \times 10^5$ | $3.5 \times 10^7$ | 187 | 115 | Poor | Excellent | Excellent |
| | 25 | 25 | 2 | 2 | $3.3 \times 10^5$ | $1.3 \times 10^7$ | 224 | 137 | Excellent | Excellent | Excellent |
| | 26 | 26 | 2 | 2 | $1.1 \times 10^6$ | $4.3 \times 10^7$ | 154 | 162 | Poor | Excellent | Excellent |
| | 27 | 27 | 2 | 2 | $6.3 \times 10^5$ | $2.6 \times 10^7$ | 194 | 134 | Excellent | Excellent | Excellent |
| | 28 | 28 | 2 | 2 | $6.2 \times 10^5$ | $2.3 \times 10^7$ | 177 | 173 | Excellent | Corroded at grain boundary | Excellent |
| | 29 | 29 | 2 | 2 | $4.5 \times 10^5$ | $1.5 \times 10^7$ | 211 | 138 | Excellent | Excellent | Excellent |
| | 30 | 30 | 2 | 2 | $7.6 \times 10^5$ | $3.8 \times 10^7$ | 169 | 163 | Poor | Excellent | Excellent |
| | 31 | 31 | 2 | 2 | $6.3 \times 10^5$ | $2.5 \times 10^7$ | 165 | 167 | Poor | Excellent | Excellent |
| | 32 | 32 | 2 | 2 | $6.1 \times 10^5$ | $2.6 \times 10^7$ | 151 | 169 | Poor | Excellent | Excellent |
| | 33 | 33 | 2 | 2 | $6.2 \times 10^5$ | $2.1 \times 10^7$ | 177 | 168 | Poor | Excellent | Excellent |
| | 34 | 34 | 2 | 2 | $6.0 \times 10^5$ | $2.3 \times 10^7$ | 168 | 166 | Poor | Excellent | Excellent |
| | 35 | 35 | 2 | 2 | $2.1 \times 10^5$ | $0.8 \times 10^7$ | 218 | 141 | Excellent | Excellent | Perforation |

TABLE 5

| Sample No. | | Core Material Alloy No. | Sacrificial Material Alloy No. | Step No. | Density of Al—Mn—Fe—Si-based Intermetallic Compound (1-20 μm) [pieces/cm²] | Density of Al—Mn—Fe—Si-based Intermetallic Compound (0.1 μm or more and less than 1 μm) [pieces/cm²] | Crystal Grain Size after NB Correspondent Heating [μm] | TS after NB Correspondent Heating [MPa] | Formability | Corrosion Resistance (in acidic environment) | Corrosion Resistance (in alkaline environment) |
|---|---|---|---|---|---|---|---|---|---|---|---|
| Example of the Invention | 36 | 2 | 1 | 2 | $6.0 \times 10^5$ | $2.2 \times 10^7$ | 198 | 152 | Excellent | Excellent | Excellent |
| | 37 | 2 | 3 | 2 | $6.2 \times 10^5$ | $2.4 \times 10^7$ | 197 | 159 | Excellent | Excellent | Excellent |
| | 38 | 2 | 4 | 2 | $6.1 \times 10^5$ | $2.8 \times 10^7$ | 194 | 155 | Excellent | Excellent | Excellent |
| | 39 | 2 | 5 | 2 | $6.4 \times 10^5$ | $2.2 \times 10^7$ | 197 | 153 | Excellent | Excellent | Excellent |
| | 40 | 2 | 6 | 2 | $6.2 \times 10^5$ | $2.3 \times 10^7$ | 189 | 157 | Excellent | Excellent | Excellent |
| | 41 | 2 | 7 | 2 | $6.5 \times 10^5$ | $2.5 \times 10^7$ | 195 | 156 | Excellent | Excellent | Excellent |
| | 42 | 2 | 8 | 2 | $6.3 \times 10^5$ | $2.4 \times 10^7$ | 188 | 150 | Excellent | Excellent | Excellent |
| | 43 | 2 | 9 | 2 | $6.4 \times 10^5$ | $2.4 \times 10^7$ | 191 | 156 | Excellent | Excellent | Excellent |
| Comparative Example | 44 | 2 | 10 | 2 | $5.9 \times 10^5$ | $2.2 \times 10^7$ | 193 | 154 | Excellent | Excellent | Perforation |
| | 45 | 2 | 11 | 2 | $6.4 \times 10^5$ | $2.6 \times 10^7$ | 191 | 154 | Excellent | Perforation | Excellent |
| | 46 | 2 | 12 | 2 | $6.5 \times 10^5$ | $2.4 \times 10^7$ | 191 | 150 | Excellent | Perforation | Excellent |
| | 47 | 2 | 13 | 2 | $6.2 \times 10^5$ | $2.4 \times 10^7$ | 193 | 159 | Excellent | Perforation | Excellent |
| | 48 | 2 | 14 | 2 | $6.3 \times 10^5$ | $2.5 \times 10^7$ | 188 | 155 | Excellent | Excellent | Perforation |
| | 49 | 2 | 15 | 2 | $6.4 \times 10^5$ | $2.4 \times 10^7$ | 194 | 154 | Poor | Excellent | Excellent |

TABLE 6

| Sample No. | | Core Material Alloy No. | Sacrificial Material Alloy No. | Step No. | Density of Al—Mn—Fe—Si-based Intermetallic Compound (1-20 μm) [pieces/cm$^2$] | Density of Al—Mn—Fe—Si-based Intermetallic Compound (0.1 μm or more and less than 1 μm) [pieces/cm$^2$] | Crystal Grain Size after NB Correspondent Heating [μm] | TS after NB Correspondent Heating [MPa] | Formability | Corrosion Resistance (in acidic environment) | Corrosion Resistance (in alkaline environment) |
|---|---|---|---|---|---|---|---|---|---|---|---|
| Example of the Invention | 50 | 2 | 2 | 1  | 3.7 × 10$^5$ | 3.1 × 10$^7$ | 221 | 152 | Excellent | Excellent | Excellent |
|  | 51 | 2 | 2 | 3  | 8.3 × 10$^5$ | 1.8 × 10$^7$ | 168 | 159 | Excellent | Excellent | Excellent |
|  | 52 | 2 | 2 | 4  | 3.4 × 10$^5$ | 2.4 × 10$^7$ | 203 | 161 | Excellent | Excellent | Excellent |
|  | 53 | 2 | 2 | 5  | 8.6 × 10$^5$ | 2.1 × 10$^7$ | 193 | 147 | Excellent | Excellent | Excellent |
|  | 54 | 2 | 2 | 6  | 3.5 × 10$^5$ | 2.6 × 10$^7$ | 200 | 158 | Excellent | Excellent | Excellent |
|  | 55 | 2 | 2 | 7  | 7.8 × 10$^5$ | 1.2 × 10$^7$ | 161 | 151 | Excellent | Excellent | Excellent |
|  | 56 | 2 | 2 | 8  | 6.5 × 10$^5$ | 1.3 × 10$^7$ | 162 | 148 | Excellent | Excellent | Excellent |
|  | 57 | 2 | 2 | 9  | 6.1 × 10$^5$ | 1.5 × 10$^7$ | 173 | 163 | Excellent | Excellent | Excellent |
|  | 58 | 2 | 2 | 10 | 6.2 × 10$^5$ | 1.2 × 10$^7$ | 172 | 149 | Excellent | Excellent | Excellent |
|  | 59 | 2 | 2 | 11 | 6.2 × 10$^5$ | 1.8 × 10$^7$ | 161 | 148 | Excellent | Excellent | Excellent |
|  | 60 | 2 | 2 | 12 | 7.0 × 10$^5$ | 1.3 × 10$^7$ | 175 | 151 | Excellent | Excellent | Excellent |
|  | 61 | 2 | 2 | 13 | 6.4 × 10$^5$ | 1.2 × 10$^7$ | 169 | 149 | Excellent | Excellent | Excellent |
| Comparative Example | 62 | 2 | 2 | 14 | 2.7 × 10$^5$ | 3.7 × 10$^7$ | 230 | 149 | Excellent | Excellent | Perforation |
|  | 63 | 2 | 2 | 15 | 2.5 × 10$^6$ | 2.6 × 10$^7$ | 205 | 163 | Excellent | Excellent | Perforation |
|  | 64 | 2 | 2 | 16 | 9.2 × 10$^5$ | 2.5 × 10$^7$ | 194 | 122 | Poor | Excellent | Excellent |
|  | 65 | 2 | 2 | 17 | 2.6 × 10$^5$ | 2.4 × 10$^7$ | 212 | 158 | Excellent | Excellent | Perforation |
|  | 66 | 2 | 2 | 18 | 8.6 × 10$^5$ | 0.8 × 10$^7$ | 141 | 149 | Excellent | Excellent | Excellent |
|  | 67 | 2 | 2 | 19 | 6.2 × 10$^5$ | 0.9 × 10$^7$ | 121 | 142 | Excellent | Excellent | Excellent |
|  | 68 | 2 | 2 | 20 | 8.1 × 10$^5$ | 0.9 × 10$^7$ | 147 | 148 | Excellent | Excellent | Excellent |
|  | 69 | 2 | 2 | 21 | 6.3 × 10$^5$ | 0.9 × 10$^7$ | 133 | 145 | Excellent | Excellent | Excellent |
|  | 70 | 2 | 2 | 22 | 6.1 × 10$^5$ | 0.8 × 10$^7$ | 144 | 146 | Excellent | Excellent | Excellent |

(1) Density of Al—Mn—Fe—Si-Based Intermetallic Compound Having Equivalent Circle Diameter of 1 to 20 μm (Pieces/cm$^2$)

The density of an Al—Mn—Fe—Si-based intermetallic compound having an equivalent circle diameter of 1 to 20 μm was measured by observing the core material alloy with an SEM (1000× magnification). That is, the cross section of the core material of a clad aluminum alloy material produced as described above after the annealing step along the thickness direction was exposed by polishing the clad aluminum alloy material. The exposed surface was used as the sample of the core material alloy. Three fields per sample were observed with the SEM, and the particles in the SEM images of the fields were analyzed by image analysis software "A-zo kun" (Asahi Kasei Engineering Corporation). The densities of the Al—Mn—Fe—Si-based intermetallic compound before braze heating were thus determined. The arithmetic mean of the three fields was regarded as the density.

(2) Density of Al—Mn—Fe—Si-Based Intermetallic Compound Having Equivalent Circle Diameter of 0.1 μm or More and Less than 1 μm (Pieces/cm$^2$)

The density of an Al—Mn—Fe—Si-based intermetallic compound having an equivalent circle diameter of 0.1 μm or more and less than 1 μm was determined as in (1) above, through SEM observation (5000× magnification) of the core material alloy and image analysis. The arithmetic mean of three fields was regarded as the density.

(3) Crystal Grain Size (μm) after NB-Corresponding Heating

A clad aluminum alloy material sample produced as described above after the annealing step was subjected to the brazing-corresponding heating. Then, the cross-section of the core material perpendicular to the rolling direction and along the thickness direction was exposed by polishing, and the mean crystal grain size was measured using an optical microscope (100× magnification). Five fields per sample were measured, and the arithmetic mean of the fields was regarded as the crystal grain size after NB correspondent heating. A crystal grain size after NB correspondent heating of 150 μm or more was regarded as excellent, and a crystal grain size of less than 150 μm was regarded as poor.

(4) TS (MPa) after NB Correspondent Heating

A TP of JIS No. 5 was cut out of a clad aluminum alloy material sample produced as described above after the annealing step and the TP was subjected to the brazing-corresponding heating. Then, the tensile strength thereof was measured according to JIS Z22241 using a tensile tester at normal temperature. Three pieces per sample were measured, and the arithmetic mean of the pieces was regarded as the TS after NB correspondent heating. A TS after NB-corresponding heating of 140 MPa or more was regarded as excellent, and a TS of less than 140 MPa was regarded as poor.

(5) Formability

A TP of JIS No. 5 was cut out of a clad aluminum alloy material sample produced as described above after the annealing step, and the elongation was measured according to JIS Z22241 using a tensile tester at normal temperature. Three pieces per sample were measured, and the arithmetic mean of the pieces was regarded as the elongation. An elongation of 5% or more was regarded as excellent, and an elongation of less than 5% was regarded as poor. The elongation is defined by the equation below.

Elongation (%)={(Distance between test points after tensile test−Distance between test points before tensile test)/(Distance between test points before tensile test)}×100

(6) Corrosion Resistance (in Acidic Environment)

A sample for the corrosion test was obtained by subjecting a clad aluminum alloy material sample (width of 3 cm×length of 3 cm) produced as described above after the annealing step to the brazing-corresponding heating. Then, the corrosion test was conducted by the method below, and whether or not a perforation was formed and whether or not the grain boundary was corroded were examined using an optical microscope (200× magnification). Samples without any perforation and any corrosion at the grain boundary were regarded as excellent, and the remaining samples were regarded as poor.

Corrosive solution: Solution prepared by adding distilled water to 226 mg of NaCl, 89 mg of $Na_2SO_4$, 145 mg of $FeCl_3 \cdot 6H_2O$ and 2.6 mg of $CuCl_2 \cdot 2H_2O$ up to 1 L Method: An immersion test was conducted for 90 days while repeating a thermal cycle of immersion in the corrosive solution at 88° C. for eight hours at a specific volume of 10 mL/cm² and holding in an atmosphere at room temperature for 16 hours, and the corrosion resistance was thus evaluated.

(7) Corrosion Resistance (in Alkaline Environment)

A sample for the corrosion test was obtained by subjecting a clad aluminum alloy material sample (width of 3 cm×length of 3 cm) produced as described above after the annealing step to the brazing-corresponding heating. Then, the corrosion test was conducted by the method below, and whether or not a perforation was formed and whether or not the grain boundary was corroded were examined using an optical microscope (200× magnification). Samples without any perforation and any corrosion at the grain boundary were regarded as excellent, and the remaining samples were regarded as poor.

Corrosive solution: Solution prepared by adding distilled water to 226 mg of NaCl, 89 mg of $Na_2SO_4$, 145 mg of $FeCl_3 \cdot 6H_2O$ and 2.6 mg of $CuCl_2 \cdot 2H_2O$ up to 1 L and then adjusting the pH to 11 with NaOH Method: An immersion test was conducted for 90 days while repeating a thermal cycle of immersion in the corrosive solution at 88° C. for eight hours at a specific volume of 10 mL/cm² and holding in an atmosphere at room temperature for 16 hours, and the corrosion resistance was thus evaluated.

In Examples 1 to 22, 36 to 43 and 50 to 61 of the invention, the densities of the Al—Mn—Fe—Si-based intermetallic compound having an equivalent circle diameter of 1 to 20 μm were $3.0 \times 10^5$ to $1.0 \times 10^6$ pieces/cm², and the densities of the Al—Mn—Fe—Si-based intermetallic compound having an equivalent circle diameter of 0.1 μm or more and less than 1 μm were $1.0 \times 10^7$ pieces/cm² or more. The crystal grain sizes after NB-corresponding heating were 150 μm or more, and the TSs after NB-corresponding heating were 140 MPa or more. Also, the corrosion resistance of each Example was excellent both in the acidic environment and in the alkaline environment. Moreover, the formability of each Example was excellent.

On the contrary, in Comparative Example 23, because the Si content of the core material was too low, the TS after NB correspondent heating was poor.

In Comparative Example 24, because the Si content of the core material was too high, the TS after NB correspondent heating was poor, and the formability was also poor.

In Comparative Example 25, because the Fe content of the core material was too low, the TS after NB correspondent heating was poor.

In Comparative Example 26, because the Fe content of the core material was too high, the density of the Al—Mn—Fe—Si-based intermetallic compound having an equivalent circle diameter of 1 to 20 μm was too high. As a result, the formability was poor.

In Comparative Example 27, because the Cu content of the core material was too low, the TS after NB correspondent heating was poor.

In Comparative Example 28, because the Cu content of the core material was too high, the grain boundary was corroded in the acidic environment, and the corrosion resistance in the acidic environment was poor.

In Comparative Example 29, because the Mn content of the core material was too low, the TS after NB correspondent heating was poor.

In Comparative Example 30, because the Mn content of the core material was too high, the formability was poor.

In Comparative Example 31, because the Ti content of the core material was too high, the formability was poor.

In Comparative Example 32, because the Zr content of the core material was too high, the formability was poor.

In Comparative Example 33, because the V content of the core material was too high, the formability was poor.

In Comparative Example 34, because the Cr content of the core material was too high, the formability was poor.

In Comparative Example 35, because the sum of the Si content and the Fe content of the core material was too small, the densities of the Al—Mn—Fe—Si-based intermetallic compounds having equivalent circle diameters of 1 to 20 μm and of 0.1 μm or more and less than 1 μm were both too low. As a result, a perforation was formed in the alkaline environment, and the corrosion resistance in the alkaline environment was poor.

In Comparative Example 44, because the Si content of the sacrificial anode material was too low, a perforation was formed in the alkaline environment, and the corrosion resistance in the alkaline environment was poor.

In Comparative Example 45, because the Si content of the sacrificial anode material was too high, a perforation was formed in the acidic environment, and the corrosion resistance in the acidic environment was poor.

In Comparative Example 46, because the Zn content of the sacrificial anode material was too low, a perforation was formed in the acidic environment, and the corrosion resistance in the acidic environment was poor.

In Comparative Example 47, because the Zn content of the sacrificial anode material was too high, a perforation was formed in the acidic environment, and the corrosion resistance in the acidic environment was poor.

In Comparative Example 48, because the Ni content of the sacrificial anode material was too low, a perforation was formed in the alkaline environment, and the corrosion resistance in the alkaline environment was poor.

In Comparative Example 49, because the Ni content of the sacrificial anode material was too high, the formability was poor.

In Comparative Example 62, because the casting cooling rate was too slow, the density of the Al—Mn—Fe—Si-based intermetallic compound having an equivalent circle diameter of 1 to 20 μm was too low. As a result, a perforation was formed in the alkaline environment, and the corrosion resistance in the alkaline environment was poor.

In Comparative Example 63, because the soaking temperature was too low, the density of the Al—Mn—Fe—Si-based intermetallic compound having an equivalent circle diameter of 1 to 20 μm was too high. As a result, a perforation was formed in the alkaline environment, and the corrosion resistance in the alkaline environment was poor.

In Comparative Example 64, because the soaking temperature was too high, the TS after NB correspondent heating was poor, and the formability was also poor.

In Comparative Example 65, because the soaking period was too short, the density of the Al—Mn—Fe—Si-based intermetallic compound having an equivalent circle diameter of 1 to 20 μm was too low. As a result, a perforation was formed in the alkaline environment, and the corrosion resistance in the alkaline environment was poor.

In Comparative Example 66, because the rate of cooling after soaking was too slow, the density of the Al—Mn—Fe—Si-based intermetallic compound having an equivalent circle diameter of 0.1 μm or more and 1 μm or less was too low. As a result, the crystal grain size after NB correspondent heating was poor.

In Comparative Example 67, because the pre-rolling heating temperature was too low, the density of the Al—Mn—Fe—Si-based intermetallic compound having an equivalent circle diameter of 0.1 μm or more and 1 μm or less was too low. As a result, the crystal grain size after NB correspondent heating was poor.

In Comparative Example 68, because the pre-rolling heating temperature was too high, the density of the Al—Mn—Fe—Si-based intermetallic compound having an equivalent circle diameter of 0.1 μm or more and 1 μm or less was too low. As a result, the crystal grain size after NB correspondent heating was poor.

In Comparative Example 69, because the pre-rolling heating period was too short, the density of the Al—Mn—Fe—Si-based intermetallic compound having an equivalent circle diameter of 0.1 μm or more and 1 μm or less was too low. As a result, the crystal grain size after NB correspondent heating was poor.

In Comparative Example 70, because the process annealing temperature was too high, the density of the Al—Mn—Fe—Si-based intermetallic compound having an equivalent circle diameter of 0.1 μm or more and 1 μm or less was too low. As a result, the crystal grain size after NB correspondent heating was poor.

INDUSTRIAL APPLICABILITY

The clad aluminum alloy material according to the invention has excellent corrosion resistance also in an alkaline environment and has excellent brazing property.

The invention claimed is:
1. A clad aluminum alloy material with excellent brazeability and corrosion resistance, comprising:
an aluminum alloy core material,
a sacrificial anode material clad on one surface of the core material and
an Al—Si-based brazing filler metal clad on the other surface of the core material,
wherein the core material comprises an aluminum alloy comprising Si: 0.3 to 1.5 mass %, Fe: 0.1 to 1.5 mass %, Cu: 0.2 to 1.0 mass %, Mn: 1.0 to 2.0 mass % and a balance of Al and unavoidable impurities, the aluminum alloy satisfies the relation that Si content+Fe content ≥0.8 mass %, the 1-20 μm equivalent circle diameter Al—Mn—Si—Fe-based intermetallic compound density is $3.0 \times 10^5$ to $1.0 \times 10^6$ pieces/cm$^2$, and the 0.1 μm to less than 1 μm equivalent circle diameter Al—Mn—Si—Fe-based intermetallic compound density is at least $1.0 \times 10^7$ pieces/cm$^2$, and the sacrificial anode material comprises an aluminum alloy comprising Si: 0.1 to 0.6 mass %, Zn: 1.0 to 5.0 mass %, Ni: 0.1 to 2.0 mass % and a balance of Al and unavoidable impurities.

2. The clad aluminum alloy material with excellent brazeability and corrosion resistance according to claim 1, wherein the core material further comprises one or, two or more selected from Ti: 0.05 to 0.20 mass %, Zr: 0.05 to 0.20 mass %, V: 0.05 to 0.20 mass % and Cr: 0.05 to 0.20 mass %.

3. The clad aluminum alloy material according to claim 1, wherein the crystal grain size of the core material is capable of achieving at least 150 μm after brazing correspondent heating at 600° C. for three minutes.

4. The clad aluminum alloy material according to claim 1, which is capable of having a tensile strength of at least 140 MPa after brazing correspondent heating at 600° C. for three minutes.

5. The clad aluminum alloy material according to claim 1 having an elongation of at least 5% along the rolling direction.

6. A method for producing the clad aluminum alloy material according to claim 1, comprising:
a step of casting the aluminum alloys for the core material, the sacrificial anode material and the brazing filler metal, respectively,
a post-casting heat treatment step of soaking the core material slab at a high temperature,
a cladding step of cladding the sacrificial anode material slab rolled to a predetermined thickness on one surface of the core material slab and cladding the brazing filler metal slab rolled to a predetermined thickness on the other surface,
a hot clad rolling step of hot rolling the clad material,
a cold rolling step of cold rolling the hot-clad-rolled clad material and
an annealing step of annealing the clad material at least during the cold rolling step or after the cold rolling step,
wherein the step of casting the core material slab has a casting cooling stage of cooling the slab at a rate of at least 5° C./second,
the post-casting heat treatment step has a soaking stage of soaking the cooled slab at 550 to 620° C. for at least 5 hours and a cooling stage of cooling the soaked slab at a rate of at least 50° C./hour,
the hot clad rolling step has a pre-rolling heating stage at 400 to 480° C. for at least 5 hours, and
an annealing temperature in the annealing step is 400° C. or lower.

7. The method for producing the clad aluminum alloy material according to claim 6, wherein the rolling start temperature of the hot clad rolling is 480 to 350° C., and the rolling finish temperature is 350 to 250° C.

8. The method for producing the clad aluminum alloy material according to claim 6, wherein in the cooling stage of the post-casting heat treatment step, the soaked slab is cooled at a rate of 50° C./hour to 70° C./hour.

* * * * *